(No Model.)

G. U. MEYER.
INGOT FOR PLATED WIRE.

No. 460,920. Patented Oct. 6, 1891.

WITNESSES:
Chas. H. Luther Jr.
M. F. Bligh.

INVENTOR:
George U. Meyer
by Joseph A. Miller & Co.
Attys

UNITED STATES PATENT OFFICE.

GEORGE U. MEYER, OF PROVIDENCE, RHODE ISLAND, ASSIGNOR TO THE BURDON SEAMLESS FILLED WIRE COMPANY, OF SAME PLACE.

INGOT FOR PLATED WIRE.

SPECIFICATION forming part of Letters Patent No. 460,920, dated October 6, 1891.

Application filed July 1, 1890. Serial No. 357,355. (No model.)

*To all whom it may concern:*

Be it known that I, GEORGE U. MEYER, of Providence, in the county of Providence and State of Rhode Island, have invented a new and useful Improvement in Ingots for Plated Wire; and I hereby declare that the following is a full, clear, and exact description of the same, reference being had to the accompanying drawings, forming a part of this specification.

This invention has reference to an improvement in the art of making plated wire for the use of jewelers; and it consists in the peculiar and novel process of forming a sheet of hard solder around a rod of inferior metal, then forming around the so-covered rod a sheet of precious metal and uniting the whole by heat, as will be more fully set forth hereinafter.

In the manufacture of plated wire for use in jewelry it is essential that every particle of the plating metal shall have formed a firm metallic union with the core of inferior metal, so that the plated rod or ingot may be drawn or rolled down to the desired thickness or sectional form and in all conditions present a core of inferior metal covered by a film of precious metal. By the usual process of flushing or flowing the solder between the core and the plating metal all the surfaces are not reached by the solder, and wire drawn from such ingots or plated rods often present places of considerable length where the precious metal is not firmly secured to the core.

The object of this invention is to secure the uniform distribution of the solder and a perfect union of the plating-sheet with the core.

Figure 1:
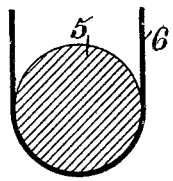
Figure 2:
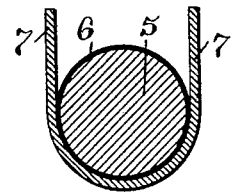
Figure 3:
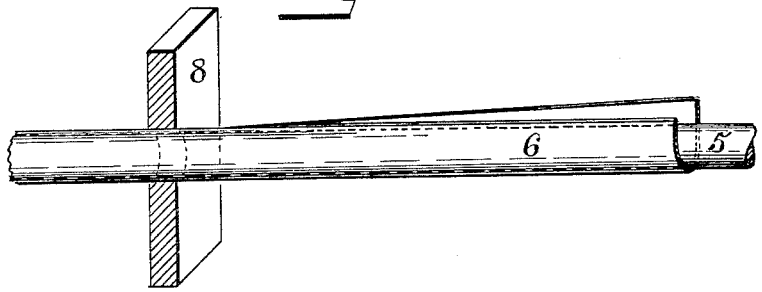

Figure 1 is a sectional view of the core or rod of inferior metal and a sheet of hard solder partly surrounding the same. Fig. 2 is a cross-section of a core covered with the sheet of solder and a sheet of plating metal partly surrounding the core. Fig. 3 is a side view of a rod, a strip, and a draw-plate, the latter being shown in section.

In the drawings, the number 5 indicates the rod or core of inferior metal, 6 the strip of sheet-solder rolled to uniform thickness and cut into a strip of such width and length as will bend around and cover the core.

7 designates the strip of precious metal, also rolled of such thickness and width as is required to cover the desired thickness of plate.

8 indicates a draw-plate.

In carrying out my invention I take a rod of inferior metal, cleaned and prepared with suitable flux, and bend partially around the rod a strip of solder previously rolled out and cut into a strip of the width required to lap around the rod 5 and meet edge to edge. I now consolidate the solder firmly on the rod by drawing it through a draw-plate or by rolling the same between suitable rolls. In practice I prefer the use of the draw-plate. I now take a strip of sheet metal rolled out and cut to the exact thickness and width required to cover the solder-covered rod, bend the sheet partly around the solder-covered rod, and draw the whole again through a draw-plate. I now subject the so-consolidated compound rod to sufficient heat to fuse the solder, and thus unite the plating-sheet firmly to the core and uniformly at all parts of the surface.

If tubular wire is required the core 5 may be formed of a tube of inferior metal. The so plated rod may now be drawn or rolled into wire, strips, or sheets, and may be manipulated exactly in the same manner and for all the purposes for which plated rods or cores as heretofore constructed are or have been used.

Having thus described my invention, I claim as new and desire to secure by Letters Patent—

The herein-described process for plating ingot-rods, the same consisting in bending a sheet of solder around the prepared rod, consolidating the sheet of solder on the rod by rolling or drawing the solder-covered rod through a draw-plate, then bending a sheet of plating metal around the solder-covered rod, forcing the sheet of plating metal into close contact with the solder-covered rod by drawing the same through a draw-plate, and then subjecting the compound rod to heat to melt the solder, as described.

GEORGE U. MEYER.

Witnesses:
J. A. MILLER, Jr.,
M. F. BLIGH.